United States Patent
Almalki et al.

(10) Patent No.: US 9,148,567 B2
(45) Date of Patent: Sep. 29, 2015

(54) METHODS AND DEVICES FOR CONTROLLING CAMERA IMAGE CAPTURE

(71) Applicant: RESEARCH IN MOTION LIMITED, Waterloo (CA)

(72) Inventors: Nazih Almalki, Waterloo (CA); Zhe Chen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 272 days.

(21) Appl. No.: 13/624,132

(22) Filed: Sep. 21, 2012

(65) Prior Publication Data

US 2014/0085495 A1 Mar. 27, 2014

(51) Int. Cl.
*H04N 5/232* (2006.01)

(52) U.S. Cl.
CPC ....... *H04N 5/23245* (2013.01); *H04N 5/23251* (2013.01)

(58) Field of Classification Search
CPC .................. H04N 5/2328; H04N 5/23248
USPC ................. 348/208.99–208.14, 143, 155
See application file for complete search history.

(56) References Cited

U.S. PATENT DOCUMENTS

| | | | |
|---|---|---|---|
| 2010/0053345 | A1 | 3/2010 | Kim et al. |
| 2010/0265344 | A1 | 10/2010 | Velarde et al. |
| 2010/0309334 | A1 | 12/2010 | James et al. |
| 2013/0258122 | A1* | 10/2013 | Keane et al. ............... 348/208.4 |

FOREIGN PATENT DOCUMENTS

WO   2007143415 A2   12/2007

OTHER PUBLICATIONS

EPO, Extended European Search Report relating to application No. 12185552.2 dated Mar. 12, 2013.
CIPO, CA Office Action relating to Application No. 2,825,342, dated Jan. 28, 2015.

* cited by examiner

*Primary Examiner* — Tuan Ho
(74) *Attorney, Agent, or Firm* — Rowand LLP

(57) ABSTRACT

Methods and devices for controlling the number of consecutive images captured in a burst operating mode are described. In one example embodiment, the present disclosure describes a method implemented by a processor of an electronic device. The electronic device has a camera module. The camera module is configured to temporarily capture a number of consecutive images to an image buffer when operation of the camera module is triggered. The method includes: obtaining motion data from a motion sensor on the electronic device; and based on the motion data, controlling the number of consecutive images captured by the camera module when operation of the camera module is triggered.

20 Claims, 4 Drawing Sheets

METHODS AND DEVICES FOR CONTROLLING CAMERA IMAGE CAPTURE

TECHNICAL FIELD

The present disclosure relates to camera management, and more particularly, to methods and devices for controlling the number of consecutive images captured by a camera.

BACKGROUND

Electronic devices such as smartphones and tablet computers are often equipped with one or more cameras. For example, electronic devices may be equipped with a front-facing camera, which is oriented to capture an image of a subject located near a side of the electronic device which includes the main display of the electronic device. Electronic devices may also be equipped with a rear facing camera, which is oriented to capture an image of a subject located near a side of the electronic device which does not include the main display of the electronic device.

Images captured by the cameras on the electronic device may often be susceptible to image blur. That is, the image may be blurred due to camera movements when capturing the image. For example, a user of the electronic device may inadvertently shake the camera when capturing an image, resulting in the image being blurred.

BRIEF DESCRIPTION OF THE DRAWINGS

Reference will now be made, by way of example, to the accompanying drawings which show an embodiment of the present application, and in which.

Like reference numerals are used in the drawings to denote like elements and features.

DETAILED DESCRIPTION OF EXAMPLE EMBODIMENTS

In one example embodiment, the present disclosure describes a method implemented by a processor of an electronic device. The electronic device has a camera module. The camera module is configured to temporarily capture a number of consecutive images to an image buffer when operation of the camera module is triggered. The method includes: obtaining motion data from a motion sensor on the electronic device; and based on the motion data, controlling the number of consecutive images captured by the camera module when operation of the camera module is triggered.

In another aspect, the present disclosure describes an electronic device. The electronic device includes a memory and a camera module configured to temporarily capture a number of consecutive images to an image buffer when operation of the camera module is triggered. The electronic device further includes a motion sensor and a processor coupled to the memory, the camera module and the motion sensor. The processor is configured to: obtain motion data from the motion sensor; and based on the motion data, control the number of consecutive images captured by the camera module when operation of the camera module is triggered.

In yet a further aspect, the present disclosure describes a computer readable storage medium. The computer readable storage medium includes computer executable instructions which, when executed, configure a processor to: obtain motion data from a motion sensor on an electronic device; and based on the motion data, control the number of consecutive images captured by a camera module of the electronic device when operation of the camera module is triggered.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Electronic Device

Figure 1:
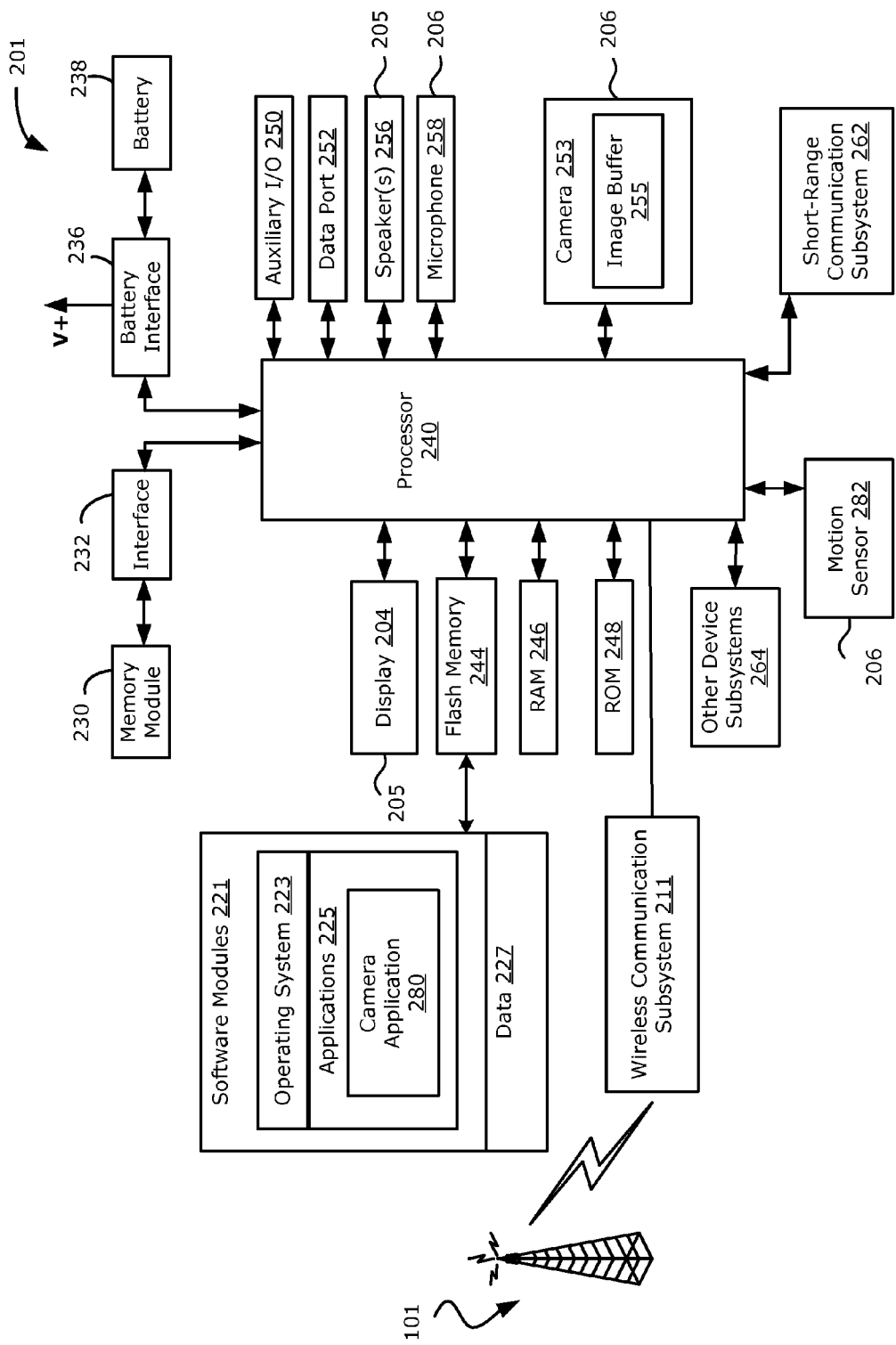
FIG. 1 is a block diagram illustrating an example electronic device in accordance with example embodiments of the present disclosure.

Reference is first made to FIG. 1 which illustrates an example electronic device 201 in which example embodiments described in the present disclosure can be applied. In the example embodiment illustrated, the electronic device 201 is a mobile communication device. That is, the electronic device 201 is configured to communicate with other electronic devices, servers and/or systems (i.e. it is a "communication" device) and the electronic device 201 is portable and may be easily moved between different physical locations (i.e. it is a "mobile" device). However, in other example embodiments, the electronic device 201 may not be portable (i.e. may not be a "mobile" device) and/or may not be configured to communicate with other systems (i.e. may not be a "communication" device).

Depending on the functionality provided by the electronic device 201, in various example embodiments the electronic device 201 may be a multiple-mode communication device configured for both data and voice communication, a mobile telephone such as a smartphone, a wearable computer such as a watch, a tablet computer such as a slate computer, a personal digital assistant (PDA), or a computer system. The electronic device 201 may take other forms apart from those specifically listed above. The electronic device 201 may also, in various example embodiments, be referred to as a mobile communications device, a communication device, a mobile device, an electronic device and, in some cases, as a device.

The electronic device 201 includes a housing, housing the components of the electronic device 201. The internal components of the electronic device 201 are constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 may be communicably coupled with additional device subsystems including one or more output interfaces 205 (such as a display 204 and/or a speaker 256), one or more input interfaces 206 (such as a camera module 253, a microphone 258, a motion sensor 282, a keyboard (not shown), control buttons (not shown), a touch-sensitive overlay (not shown) associated with a touchscreen display and/or other input interfaces 206), memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display 204). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The particular design of the wireless communication subsystem 211 depends on the wireless network 101 in which the electronic device 201 is intended to operate. The wireless network 101 may include one or more of a Wireless Wide Area Network (WWAN) and/or a Wireless Local Area Network (WLAN) and/or other suitable network arrangements. In some example embodiments, the electronic device 201 is configured to communicate over both the WWAN and WLAN, and to roam between these networks. The electronic device 201 may send and receive communication signals over the wireless network 101 via the wireless communication subsystem 211 after the required network registration or activation procedures have been completed.

In at least some example embodiments, the auxiliary input/output (I/O) subsystems 250 may include an external communication link or interface; for example, an Ethernet connection. The electronic device 201 may include other wireless communication interfaces for communicating with other types of wireless networks 101; for example, a wireless network 101 such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (i.e. touch feedback).

In at least some example embodiments, the electronic device 201 also includes a removable memory module 230 (which may be flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

The electronic device 201 includes a camera module 253. The camera module 253 is capable of capturing camera data, such as images (in which case the camera data may be referred to as image data), in the form of still photo and/or motion data. The camera data may be captured in the form of an electronic signal which is produced by an image sensor associated with the camera module 253.

The camera module 253 may include various components that assist in the capturing of images. For example, the camera module 253 may include an image sensor, one or more lens elements, a shutter, an infrared (IR) cut-off filter, a storage card, etc. In at least some example embodiments, the camera module 253 may additionally include an image buffer 255.

The image buffer 255 is provided in memory (for example, RAM) which temporarily stores image data of a captured image prior to the image being processed and/or stored in memory (for example, the flash memory 244) of the electronic device 201. That is, the image buffer 255 temporarily holds the image data before it is written out to the permanent memory of the electronic device 201.

In at least some example embodiments, the image buffer 255 may allow for a burst operating mode of the camera module 253. That is, the camera module 253 may allow capture of a number of consecutive images for each camera module 253 trigger (i.e. for each shutter release input). The number of consecutive images captured may depend upon the capacity of the associated image buffer 255 which temporarily stores the consecutive images. In at least some example embodiments, the number of consecutive images captured by the camera module 253 on the image buffer 255 may be varied. That is, the capacity of the image buffer 255 may be of a variable length (as opposed to a fixed length), and its capacity may be manipulated to control the number of consecutive images captured for storage.

In the illustrated example, the image buffer 255 is shown as part of the camera module 253. However, in at least some example embodiments, it will be appreciated that the image buffer 255 may not be included within the camera module 253. For example, the image buffer 255 may be a stand-alone component or part of the RAM 246 of the electronic device 201.

The camera module 253 may be configured as a front facing camera or a rear facing camera. A front facing camera is provided by a camera module 253 which is located to obtain images near a front face of the electronic device 201. The front face is typically the face on which a main display 204 is mounted. That is, when a front facing camera is provided on the electronic device 201, the display 204 is configured to display content which may be viewed from a side of the electronic device 201 where the camera module 253 is directed.

The camera module 253 of the front facing camera may be located above or below the display 204. In at least some example embodiments, the camera module 253 may be provided in a central location relative to the display 204 to facilitate image acquisition of a face. For example, the camera module 253 may be located centrally above the display 204.

A rear facing camera is provided by a camera module 253 which is located to obtain images of a subject near a rear side of the electronic device 201. The rear side is typically a side which does not include the main display 204 of the electronic device 201. In at least some embodiments, the display 204 of the electronic device 201 may act as a viewfinder displaying image data associated with a rear facing camera. In such example embodiments, the electronic device 201 may include various operating modes for the viewfinder (for example, in one operating mode, the electronic device 201 provides a wallpaper viewfinder).

The rear facing camera may obtain images which are not within the field of view of the front facing camera. The field of view of the front facing and rear facing cameras may generally be in opposing directions.

While FIG. 1 illustrates a single camera module 253, the electronic device 201 may include a plurality of camera modules 253. For example, in at least some example embodiments, the electronic device 201 may include both a front facing camera and a rear facing camera.

In at least some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable or Bluetooth® connection to the host computer system for processing.

In at least some example embodiments, the electronic device 201 may include one or more sensors. For example, the electronic device 201 may include a motion sensor 282 that detects motion (i.e. movements) of the electronic device 201 or that generates information from which the motion of the electronic device 201 can be determined. For example, in at least some example embodiments, the motion sensor 282 may include a gyroscope (such as a three-axis gyroscope). A gyroscope is a sensor that measures the rotational velocity of the electronic device 201. That is, the gyroscope may generate an output which specifies the rotational rate of the electronic device 201. For example, the gyroscope may define one or more sensing axis, and motion at each of the one or more sensing axis may be measured as a rotation per unit of time, irrespective of the other sensing axis. Accordingly, the gyroscope may generate motion data associated with movements of the electronic device 201.

In at least some example embodiments, the motion sensor 282 includes an accelerometer (such as a three-axis accelerometer). An accelerometer is a sensor that measures the acceleration of the electronic device 201. That is, the accelerometer may generate an output which specifies the magnitude and/or direction of acceleration of the electronic device 201. The accelerometer converts acceleration from motion (of the electronic device 201) and gravity which are detected by a sensing element into a corresponding output signal. Accordingly, the accelerometer may be utilized to detect motion of the electronic device 201, and generate motion data associated with movements of the electronic device 201.

In at least some example embodiments, the motion sensor 282 may be of other forms and/or a combination of sensors.

As mentioned above, the motion sensor 282 may generate motion data which quantifies and/or identifies the motion of the electronic device 201. The motion data, in at least some example embodiments, specifies the motion of the electronic device 201 relative to the earth. The obtained motion data may be utilized for various purposes, including configuring functions and features of the electronic device 201. For example, in at least some example embodiments, the motion data may be used to control the number of consecutive images captured by the camera module when the camera module 253 is triggered (i.e. when an instruction to capture an image is received (e.g. when a shutter button is activated)). That is, the number of consecutive images captured by the camera module 253 for each trigger may be varied based on detected movements of the electronic device 201.

It will be appreciated that the motion sensor 282 may generate information that may be utilized for other purposes. For example, the measurements of the accelerometer and/or gyroscope may provide orientation of the electronic device 201. That is, the accelerometer and/or gyroscope may generate orientation data that specifies the orientation of the electronic device 201. Such orientation data may, for example, be used to influence the operation of the electronic device 201. For example, the electronic device 201 may switch between a portrait operating mode and a landscape operating mode based on the orientation data.

The electronic device 201 also includes or is connectable to a power source such as a battery 238. The battery 238 may be one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 227 in an erasable persistent memory, which in one example embodiment is the flash memory 244. In various example embodiments, the data 227 includes service data including information used by the electronic device 201 to establish and maintain communication with the wireless network 101. The data 227 may also include user application data such as email messages, address book and contact information, image data, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the memory.

The electronic device 201, in at least some example embodiments, may be a mobile communication device which may provide two principal modes of communication: a data communication mode and a voice communication mode. In the data communication mode, a received data signal such as a text message, an email message, or a web page download are processed by the wireless communication subsystem 211 and input to the processor 240 for further processing. For example, a downloaded web page may be further processed by a browser application or an email message may be processed by an email messaging application and output to the display 204. A user of the electronic device 201 may also compose data items, such as email messages, for example, using the input devices in conjunction with the display 204. These composed items may be transmitted through the wireless communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (e.g., a voice communication module) and hardware (e.g., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system 223 software and other software applications 225.

The software applications 225 on the electronic device 201 may also include a range of additional applications including, for example, a notepad application, Internet browser application, voice communication (e.g. telephony) application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent. Although specific functions are described for various types of memory, this is merely one example, and it will be appreciated that a different assignment of functions to types of memory could also be used.

A predetermined set of applications that control basic device operations, including data and possibly voice communication applications may be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable device subsystem 264. The downloaded programs or code modules may be permanently installed, for example, written into the program memory (i.e. the flash memory 244), or written into and executed from the RAM 246 for execution by the processor 240 at runtime.

The processor 240 may be electrically connected to the camera module 253 to allow the processor 240 to receive electronic signals representing camera data from the camera module 253 including the image buffer 255.

In at least some example embodiments, the software modules 221 may include one or more camera applications 280 or software modules which are configured for handling the electronic signals representing camera data from the camera module 253. The camera application 280 may, for example, be configured to provide a viewfinder on the display 204 by displaying, in real time or near real time, images defined in the electronic signals received from the camera module 253. The camera application 280 may also be configured to capture images or videos by storing images or videos defined by the electronic signals received from the camera module 253. For example, the camera application 280 may be configured to store the images or videos to memory, for example the flash memory 244, of the electronic device 201. In at least some example embodiments, the images or videos may first be stored in the image buffer 255 prior to being stored in the memory of the electronic device 201. The images may be stored in various formats including JPEG, RAW, BMP, etc.

The camera application 280 may also be configured to control options or preferences associated with the camera module 253. For example, the camera application 280 may be configured to control a camera lens aperture and/or shutter speed associated with the camera module 253. The control of such features may, in at least some embodiments, be automatically performed by the camera application 280 based on output received from a light exposure meter.

In at least some example embodiments, the camera application 280 may be configured to control a flash associated with the camera module 253 and/or to control a zoom associated with the camera module 253. In at least some example embodiments, the camera application 280 is configured to provide digital zoom features. The camera application 280 may provide digital zoom features by cropping an image down to a centered area with the same aspect ratio as the original. In at least some example embodiments, the camera application 280 may interpolate within the cropped image to bring the cropped image back up to the pixel dimensions of the original. The camera application 280, in at least some example embodiments, may provide image stabilization for the camera module 253. Image stabilization may reduce blurring associated with movement of the camera module 253.

In at least some example embodiments, the camera application 280 may be configured to focus the camera module 253 on a subject. For example, the camera application 280 may be configured to control actuators of the camera module 253 to move lenses (a lens may be comprised of one or more lens elements) in the camera module 253 relative to an image sensor in the camera module 253. For example, when capturing images of subjects which are very far from the camera module 253, the camera application 280 may control the actuators to cause the actuators to move the lenses away from the image sensor (i.e. to magnify the subjects).

In at least some example embodiments, the camera application 280 may provide various operating modes for operating the camera module 253. For example, the camera application 280 may provide a burst operating mode for the camera module 253. That is, the camera module 253 is enabled to capture a number of consecutive images when the camera module 253 is triggered. For example, for each shutter release input, a number of consecutive images are captured on to the image buffer 255 (the shutter release input may be received when a user activates a shutter release button or another input interface which allows a user to input an instruction to capture an image such as a virtual shutter release button which may be provided on a touchscreen display 204). One or more of the captured images may then be stored to more permanent memory (for example, the flash memory 244) of the electronic device 201 from the image buffer 255. Upon transfer of the images to the more permanent memory, the images may be discarded from the image buffer 255 to free up storage space on the image buffer 255. In at least some embodiments, one or more images may be selected from the group of images that are captured to the image buffer 255 and the other images may be discarded. That is, in at least some operating modes, the burst operating mode may gather a plurality of images in response to a single instruction to obtain an image and a preferred image may be selected from the plurality of images. Such selection may be automatic (i.e. it may be performed without user input) or may rely on user input. For example, the camera application 280 may evaluate the quality of each image and may select the highest quality image as the preferred image. Unselected images may be discarded in some embodiments and the preferred image may be committed to more permanent memory.

In at least some embodiments, the quality of an image may be evaluated based on the amount of motion occurring when the image was captured. That is, data from the motion sensor 282 may be used to evaluate whether the image is likely to be high quality. The quality of the image may be associated with the amount of movement occurring at the time the image was captured. More movement may cause more blurring of features of the image. Thus, images may be evaluated by correlating an image with motion data obtained when that image was captured. For example, motion data may be time tagged (i.e. a motion data sample may be associated with a time stamp identifying when the motion data sample was obtained) and an image may also be time tagged (i.e. the image may be associated with a time stamp identifying when the image was captured) and images may be correlated with motion data using the times.

In at least some example embodiments, the camera application 280 may associate each of the captured consecutive images with motion data representing the amount of motion occurring at the electronic device 201 when each of the images was captured. The camera application 280 may then determine whether the amount of motion exceeds a threshold based on the motion data associated with each of the captured images. Images that are captured when the amount of motion of the electronic device 201 exceeds the threshold are discarded, while images that are captured when the amount of motion of the electronic device 201 is below the threshold are maintained. That is, if the motion data indicates that too much motion occurred when the image was captured, the electronic device 201 may determine that the quality of the image is likely to be poor and may discard the image.

Accordingly, in at least some embodiments, an image may be discarded if the amount of motion occurring when the image was captured exceeds a threshold. The threshold may, in some embodiments, be predetermined. In some embodiments, the threshold may be selected based on the amount of motion occurring for other images captured during the same burst of image captures. That is, instead of evaluating the amount of motion against a fixed, predetermined threshold, the threshold may be variable. For example, in some embodiments, a predetermined number of images captured during the greatest amount of motion may be discarded.

Accordingly, in at least some embodiments, the electronic device may discard images captured during a burst operating mode of the electronic device based on the motion occurring when those images were captured. In some embodiments, all but one image may be discarded based on the motion data. That is, the electronic device 201 may effectively select the image captured during the period of the least amount of motion and may discard all of the other images. In other embodiments, the electronic device 201 may keep a greater number of images. For example, in at least some embodiments, the electronic device 201 may use the motion data to discard one or more images captured during periods of relatively high motion but may retain a plurality of images.

In some embodiments, the amount of motion occurring when an image was captured may be one of a number of criteria used for evaluating images. For example, the amount of motion may be used to reduce a large group of images captured during a burst operating mode to a smaller group of images, and the smaller group of images may then be evaluated using further criteria to further reduce the group of images. For example, in at least some embodiments, the further criteria may be used to reduce the group of images into a single image (i.e. it may be used to effectively select one image as the preferred image). By way of example, the further criteria may perform a software based analysis on the image to identify images where a subject's eyes are closed and may discard one or more of the images where a subject's eyes are closed.

As noted above, in the burst operating mode, a plurality of images may be captured in response to a single input instructing the electronic device 201 to capture an image (e.g. a single shutter release input may cause a plurality of images to be captured consecutively). In at least some example embodiments, in the burst operating mode, the camera application 280 may manipulate the number of consecutive images captured by the camera module 253. For example, the camera application 280 may obtain motion data from the motion sensor 282, and control the number of consecutive images captured by the camera module 253 based on the motion data, when the camera module 253 is triggered. For example, in such example embodiments, the camera application 280 may determine whether the motion of the electronic device 201 is greater than or less than a pre-determined threshold. When the motion is greater than the pre-determined threshold, the camera application 280 may increase the number of consecutive images captured by the camera module 253 for each trigger; and when the motion is less than the pre-determined threshold, the camera application 280 may decrease the number of consecutive images captured by the camera module 253 for each trigger.

Accordingly, by controlling the number of consecutive images captured by the camera module 253, the camera application 280 may allow a user to capture a varying number of images based on the movements of the electronic device 201 (and the associated camera module 253), to obtain one or more preferred images. Since motion is likely to cause image blurring, more motion may cause more images to be captured, thereby increasing the pool of candidate images from which a selection of a preferred image may be made.

Specific functions and features of the camera application 280 will be discussed in greater detail below with reference to FIGS. 4 and 5.

While the embodiment discussed above includes a processor 240 coupled with a camera application 280 which collectively act as an image signal processor to provide image related functions such as focusing, in other example embodiments (not shown), another processor such as a dedicated image signal processor, may provide some or all of these functions.

In at least some example embodiments, the operating system 223 may perform some or all of the functions of the camera application 280. In other example embodiments, the functions or a portion of the functions of the camera application 280 may be performed by one or more other applications.

Further, while the camera application 280 has been illustrated as a stand-alone application, in other example embodiments, the camera application 280 may be implemented as part of the operating system 223 or another application 225. Furthermore, in at least some example embodiments, the functions of the camera application 280 may be provided by a plurality of software modules. In at least some example embodiments, these software modules may be divided among multiple applications.

Example Electronic Device

As discussed above, the electronic device 201 may take a variety of forms. For example, in at least some example embodiments, the electronic device 201 may be a smartphone.

Figure 2:
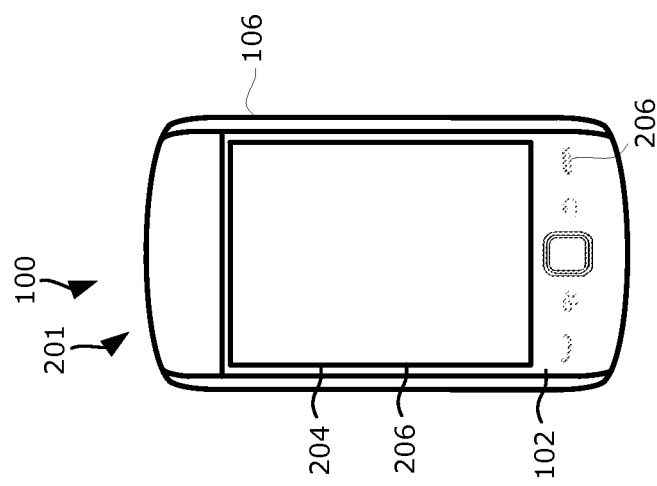
FIG. 2 is a front view of an example electronic device in accordance with example embodiments of the present disclosure.

Referring now to FIG. 2, a front view of an example electronic device 201 which is a smartphone 100 is illustrated. The smartphone 100 is a mobile phone which offers more advanced computing capability than a basic non-smartphone cellular phone. For example, the smartphone 100 may have the ability to run third party applications which are stored on the smartphone 100.

The smartphone 100 may include the components discussed above with reference to FIG. 1 or a subset or superset of those components. The smartphone 100 includes a housing 106 which houses at least some of the components discussed above with reference to FIG. 1.

In the example embodiment illustrated, the electronic device 201 includes a display 204, which may be a touchscreen display which acts as an input interface 206. The display 204 is disposed within the electronic device 201 so that it is viewable at a front side 102 of the electronic device 201. That is, a viewable side of the display 204 is disposed on the front side 102 of the electronic device 201. In the example embodiment illustrated, the display 204 is framed by the housing 106.

The example electronic device 201 also includes other input interfaces 206 such as one or more buttons, keys or navigational input mechanisms. In the example embodiment illustrated, at least some of these additional input interfaces 206 are disposed for actuation at a front side 102 of the electronic device 201.

Figure 3:
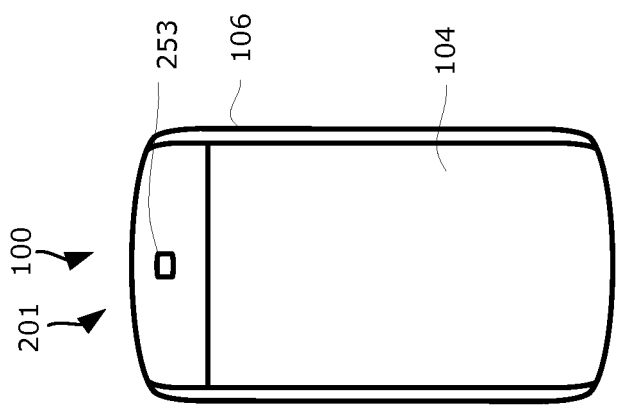
FIG. 3 is a rear view of the example electronic device of FIG. 2.

Referring now to FIG. 3, a rear view of the example electronic device 201 is illustrated. The example electronic device 201 includes a camera module 253 that is configured as a rear facing camera located on a rear side 104 of the electronic device 201. That is, the rear facing camera is located on a side of the electronic device 201 which does not include the display 204. The rear facing camera is located so that it may capture images of subjects which are located in the rear of and/or surrounding the rear side 104 of the electronic device 201. In at least some example embodiments, the electronic device 201 may operate in at least one operating mode in which the display 204, on the front side 102 of the electronic device 201, acts as a viewfinder displaying image data associated with the rear facing camera.

In at least some example embodiments, the electronic device 201 may also include one or more front facing cameras instead of, or in addition to, the rear facing camera. The front facing camera may be located on the front side 102 of the electronic device 201. The front facing cameras are located so that they may capture images of subjects which are located in front of and/or surrounding the front side 102 of the electronic device 201.

Controlling Camera Image Capture

Figure 4:
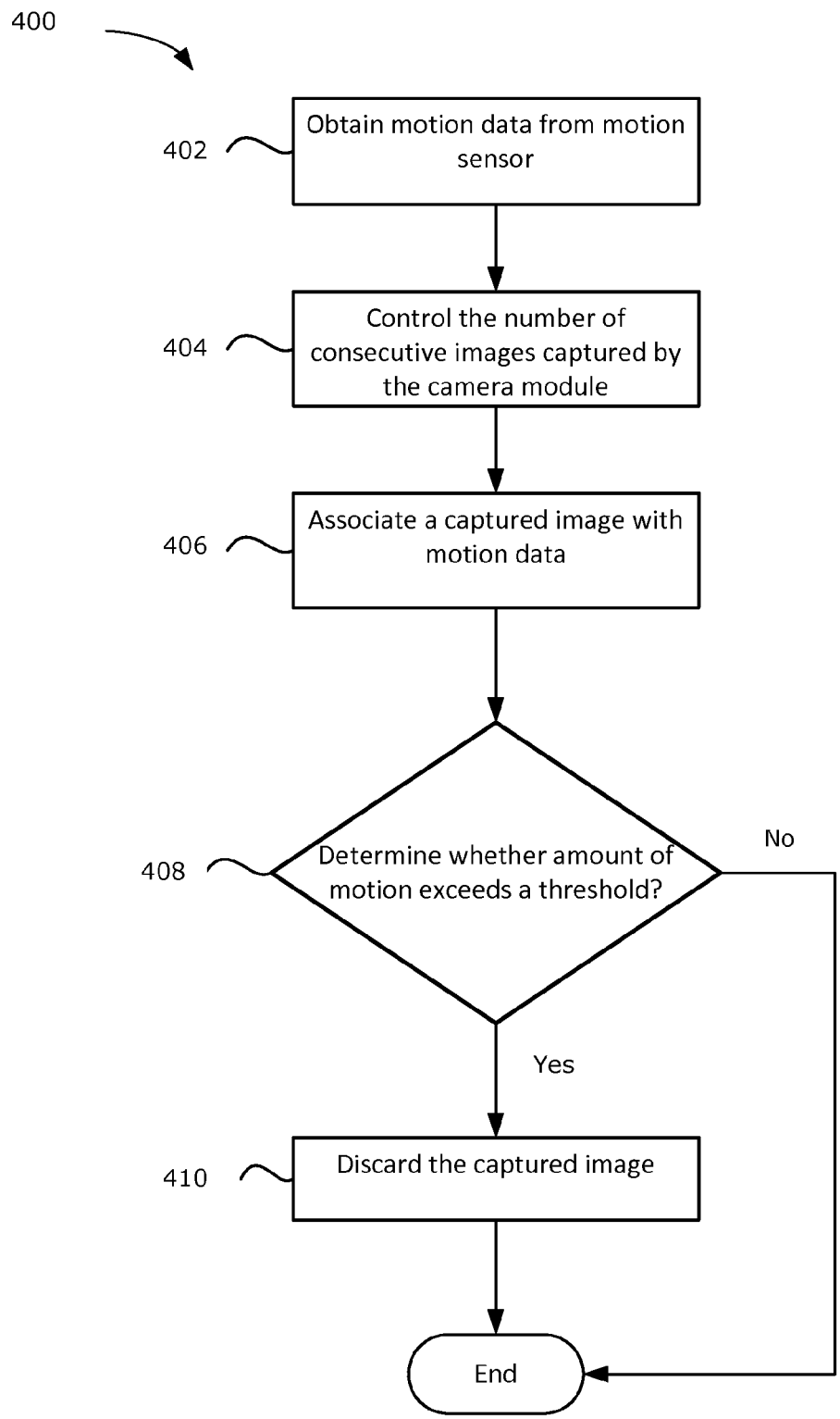
FIG. 4 is a flowchart illustrating an example method of controlling the number of consecutive images captured by a camera module in accordance with example embodiments of the present disclosure.

Referring now to FIG. 4, a flowchart of an example method 400 of controlling the number of consecutive images captured in response to an instruction to capture an image using a camera module 253 is illustrated. That is, the method 400 may be used to control the number of images captured during a burst operating mode. The electronic device 201 may be configured to perform the method 400 of FIG. 4. In at least some example embodiments, the processor 240 of the electronic device 201 is configured to perform the method 400 of FIG. 4. One or more applications 225 or modules on the electronic device 201 may contain computer readable instructions which cause the processor 240 of the electronic device 201 to perform the method 400 of FIG. 4. In at least some example embodiments, the camera application 280 stored in memory of the electronic device 201 is configured to perform the method 400 of FIG. 4. More particularly, the camera application 280 may contain computer readable instructions which, when executed, cause the processor 240 to perform the method 400 of FIG. 4.

It will be appreciated that the method 400 of FIG. 4 may, in at least some example embodiments, be provided by other software applications or modules apart from those specifically discussed above, for example, the operating system 223. Accordingly, any features which are referred to as being performed by the electronic device 201 may be performed by any one or more of the software applications 225 or modules referred to above or other software modules. In at least some example embodiments, at least some of the method 400 of FIG. 4 may be performed by or may rely on other applications 225 or modules.

The method 400 includes, at 402, obtaining motion data from the motion sensor 282 on the electronic device 201. That is, the motion sensor 282 generates motion data based on movements of the electronic device 201 which is received by the electronic device 201.

For example, in at least some example embodiments, the motion sensor 282 may be a gyroscope. In such example embodiments, the gyroscope may generate motion data specifying the rotational velocity of the electronic device 201. That is, the gyroscope may sense movements of the electronic device 201 to generate an output that specifies the rotational rate of the electronic device 201.

In at least some example embodiments, the motion sensor 282 may be an accelerometer. In such example embodiments, the accelerometer may sense movements of the electronic device 201, and generate motion data based on these associated movements. In at least some example embodiments, the motion data may be generated by the accelerometer when measuring the acceleration of the electronic device 201.

In at least some example embodiments, the electronic device 201 may include other types of sensors, in addition to or instead of a gyroscope and/or an accelerometer, to generate the motion data. In at least some example embodiments, the electronic device 201 may include a combination of motion sensors (for example, a gyroscope and an accelerometer) to generate the motion data.

After obtaining the motion data, the electronic device 201, at 404, may control the number of consecutive images captured by the camera module 253 when the camera module 253 is triggered based on the motion data. The motion data may be used to adjust the number of images that will be captured during a burst. For example, in a burst operating mode of the electronic device 201 (where the camera module 253 may be triggered to capture a number of consecutive images for a single shutter release input), the number of consecutive images captured by the camera module 253 may be varied depending on the motion data. For example, for each shutter release input, the number of consecutive images stored in the image buffer 255 of the camera module 253 may be changed based on the motion data of the electronic device 201. That is, the number of images stored in the image buffer 255 in response to a single shutter release input may be decreased or increased for each shutter release input. In at least some example embodiments, the capacity of the image buffer 255 may be varied to control the number of consecutive images captured. That is, the image buffer 255 may be set to store a particular number of consecutive images based on the motion data.

In at least some example embodiments, the electronic device 201 may determine whether the motion of the electronic device 201, as represented by the motion data, is greater or less than a pre-determined threshold. That is, the electronic device 201 may compare the motion of the electronic device 201 defined by the associated motion data to a pre-determined threshold value. The number of consecutive images captured by the camera module 253 may then be manipulated based on the comparison. For example, when the motion of the electronic device 201 is determined to be greater than the pre-determined threshold, the number of consecutive images captured by the camera module 253 may be increased. That is, the camera module 253 may capture a larger number of consecutive images for each shutter release input. In at least some example embodiments, the capacity of the image buffer 255 may be increased in order to increase the number of consecutive images captured by the camera module 253. For example, the capacity of the image buffer 255 may be changed from 10 images to 20 images, and accordingly, the camera module 253 may be configured to capture 20 consecutive images instead of 10 consecutive images when the camera module 253 is triggered.

In at least some example embodiments, when the motion of the electronic device 201 is determined to be less than the pre-determined threshold, the number of consecutive images captured by the camera module 253 may be decreased. That is, the camera module 253 may capture a smaller number of consecutive images for each shutter release input. In at least some example embodiments, the capacity of the image buffer 255 may be decreased in order to decrease the number of consecutive images captured by the camera module 253. For example, the capacity of the image buffer 255 may be changed from 10 images to 5 images, and accordingly, the camera module 253 may be configured to capture 5 consecutive images instead of 10 consecutive images when the camera module 253 is triggered.

Accordingly, for larger movements of the electronic device 201 (and the associated camera module 253), the number of consecutive images captured by the camera module 253 in response to a shutter release input may be increased as compared with the number of images captured for relatively smaller movements of the electronic device 201. For example, a user operating the electronic device 201 may capture a larger number of consecutive image by the camera module 253 during unsteady hold of the electronic device 201 (i.e. the electronic device 201 experiences large movements that are greater than the pre-determined threshold). While, for smaller movements of the electronic device 201 (and the associated camera module 253), the number of consecutive images captured by the camera module 253 in response to a shutter release input may be decreased. For example, a user operating the electronic device 201, may capture a smaller number of consecutive images by the camera module 253 during steady hold of the electronic device 201 (i.e. the electronic device 201 experiences small movements that are less than the pre-determined threshold). Similarly, when the electronic device 201 is moving with the movement of a user or a vehicle (such as when the user is running or when electronic device is located in a vehicle such as a car), the number of consecutive images that are obtained in response to a shutter release input may be increased as compared with the number of consecutive images obtained when the electronic device 201 is stationary.

In at least some embodiments, the number of images that will be captured in response to a single shutter release input may be determined in response to the receipt of an input triggering the camera module 253. That is, when the electronic device 201 receives an instruction instructing the electronic device 201 to capture a burst of images, the electronic device 201 may use motion data defining the motion of the electronic device at that time in order to select the number of images to be captured by the burst.

For example, in at least some example embodiments, the electronic device 201 may receive an input triggering the camera module 253. This input has been referred to as a shutter release input at various portions of this document since it is input that is traditionally associated with a shutter release button. The input may trigger the camera module 253 to capture a number of consecutive images. That is, the electronic device 201 receives an input to release the shutter of the camera module to capture a number of consecutive images. In at least some example embodiments, the input may be received when the camera module 253 is operating within the burst operating mode and the input may, effectively, be interpreted as an input to capture a burst of images. The input may be received by an input interface 206 associated with the electronic device 201. For example, the input may be received by a navigational input device such as a trackball, a trackpad or a touchscreen display, or a physical keyboard associated with the electronic device 201 to trigger the camera module 253. In some embodiments, the input may be received via a traditional shutter release button.

In some embodiments, in response to receiving the input triggering the camera module 253, the electronic device 201 selects the number of consecutive images to be captured based on the motion data (this may occur at 404 of FIG. 4, as part of the controlling process). That is, the number of consecutive images to be captured may be determined based on the motion data representing the motion of the electronic device 201, and the number of consecutive images to be captured is accordingly selected to configure the operation of the camera module 253. In at least some example embodiments, the capacity of the image buffer 255 to store consecutive images may be manipulated to correspond to the selected number of consecutive images to be captured.

The electronic device 201 may then capture the images in accordance with the selected number (this may occur at 404 of FIG. 4 or sometime thereafter). These captured images are stored in the image buffer 255 of the electronic device 201.

In at least some example embodiments, one or more of the captured consecutive images may be stored in more permanent memory (for example, the flash memory 244) of the electronic device 201. For example, the captured consecutive images stored on the image buffer 255 may be transferred for storage on to the memory (for example, the flash memory 244) of the electronic device 201. For example, the images may be copied on to the memory. In at least some example embodiments, the images may be deleted from the image buffer 255 after they are written to more permanent memory. The images stored on the memory may be retrieved, manipulated and/or displayed on the electronic device 201.

As noted previously, in at least some embodiments, one or more of the plurality of images that are captured in response to a single shutter release input may be selected (e.g. as a preferred image) and/or discarded. As further noted above, in at least some embodiments, such selection or removal may depend in whole or in part on motion data associated with captured images.

For example, at 406, the electronic device 201 may associate a captured image with motion data representing the amount of motion occurring at the electronic device 201 when that captured image was obtained. That is, each of the consecutive images may be associated with motion data describing the movement of the electronic device at the time each of the consecutive images was captured.

The motion data that is associated with an image is motion data that is obtained when the image is captured. Accordingly, the motion data that is associated with an image may, in some example embodiments, not be the same motion data discussed with reference to 402 (which is the motion data that is used, at 404 to control the number of consecutive images captured by the camera module).

In at least some embodiments, the motion data may be associated with the image at 406 by adding motion data metadata to the image. The motion data metadata may be included in the same file as the image associated with that metadata. For example, the motion data metadata may be included into an EXIF (Exchangeable image file format) format. The motion data metadata may quantify the amount of motion occurring when the image was captured and/or may specify direction information associated with the motion.

For example, the motion data obtained from the motion sensor 282 of the electronic device 201 may be time stamped. That is, the electronic device 201 may record each time when motion of the electronic device 201 is sensed by the motion sensor 282, and associated motion data is generated. Accordingly, the motion data may be time stamped for every motion sensor 282 reading of the electronic device. In at least some example embodiments, the motion sensor 282 may be configured to obtain time stamped motion data for each capture of a consecutive image. That is, as each consecutive image is captured by the camera module 253, the motion sensor 282 obtains motion data representing the movement of the electronic device 201 at the time each image is captured by the camera module 253 and each of the images are associated with motion data representing the movement when that image was captured.

The electronic device 201, at 408, may determine, based on the motion data associated with each of the captured images, whether the amount of motion exceeds a threshold. That is, the electronic device 201 may compare the motion data associated with each of the captured images, that represents the amount of motion of the electronic device 201, to a threshold value. Images that are associated with motion data exceeding the threshold are identified (i.e. images that were captured when the amount of motion of the electronic device 201 exceeds the threshold are identified).

In at least some example embodiments, the threshold is selected based on prior motion data associated with previously captured images. That is, the threshold is chosen depending upon motion data associated with one or more previously captured images that represent the amount of motion of the electronic device 201 when each of these one or more previous images was captured. For example, if the prior motion data indicates a high level of movement of the electronic device 201 (i.e. the previous images were captured with a high level of motion), the electronic device 201 may select a higher threshold value. While, if the prior motion data includes a low level of movement of the electronic device 201 (i.e. the previous images were captured with a low level of motion), the electronic device 201 may select a lower threshold value. The previously captured images whose associated motion data is analyzed to select the threshold may be images captured within a previous burst sequence (e.g. images that are captured in response to a prior same shutter release input) or the same burst sequence (e.g. images that are captured in response to the same shutter release input).

The determination of the threshold may, in some embodiments, occur on-the-fly. That is, in at least some embodiments, the determination of the threshold may occur during a burst sequence. While the burst sequence is ongoing and images are being captured to the image buffer, the electronic device 201 may determine the threshold based on previously acquired images that were captured as part of that same burst sequence (e.g. based on the motion data associated with images already stored in the image buffer).

In some embodiments, the determination of the threshold may occur after a burst sequence has completed. That is, in some embodiments, after a burst sequence has completed, the electronic device may determine the threshold based on the motion data associated with the images captured as part of that burst sequence.

At 410, the electronic device 201 discards captured images that are associated with motion data exceeding the threshold value. That is, the images that are determined to be captured when the amount of motion of the electronic device 201 exceeds the threshold value are discarded. For example, the captured images may be deleted from the image buffer 255 of the camera module 253. The deleted images may no longer be retrievable and are permanently removed from the electronic device 201.

In at least some example embodiments (not shown) images may be discarded while the burst sequence is ongoing. That is, the discarding of images may occur on-the-fly to free up capacity in the image buffer 255 before the burst sequence has ended.

In at least some such embodiments, after removing the captured images from the image buffer 255 (when the motion data associated with the captured images exceeds the threshold), the camera module 253 may capture other images to replace the discarded captured image. That is, the camera module 253 is configured to capture images in place of the deleted previously captured images. In at least some example embodiments, the electronic device 201 may associate motion data with these other images, to determine whether the motion data exceeds the threshold and if so, delete these other images and capture further images to replace these other images. Accordingly, the electronic device 201 may continue the associating, determination, discarding and capturing process until a set number of consecutive images to be captured based on the motion data is reached with each image having associated motion data that is less than the threshold value, for a burst sequence.

As mentioned above, the electronic device 201 may provide a burst operating mode for capturing a number of consecutive images by the camera module 253. In at least some example embodiments, the electronic device 201 may additionally or as part of the burst operating mode, provide a continuous image acquisition mode. The continuous image acquisition mode allows the camera module 253 to continuously capture images until a stop signal is generated (and/or until the image buffer 255 is out of memory) That is, in the continuous image acquisition mode, in response to a shutter release input, the camera module 253 begins continuously acquiring images. In the continuous image acquisition mode, the number of images to be captured is not preselected before image capture begins. Rather, the electronic device 201 continues to capture images until a stop signal is generated telling the electronic device 201 to stop capturing images.

Example embodiments of the electronic device 201 operating within the continuous image acquisition mode for controlling the number consecutive images captured will now be described.

Figure 5:
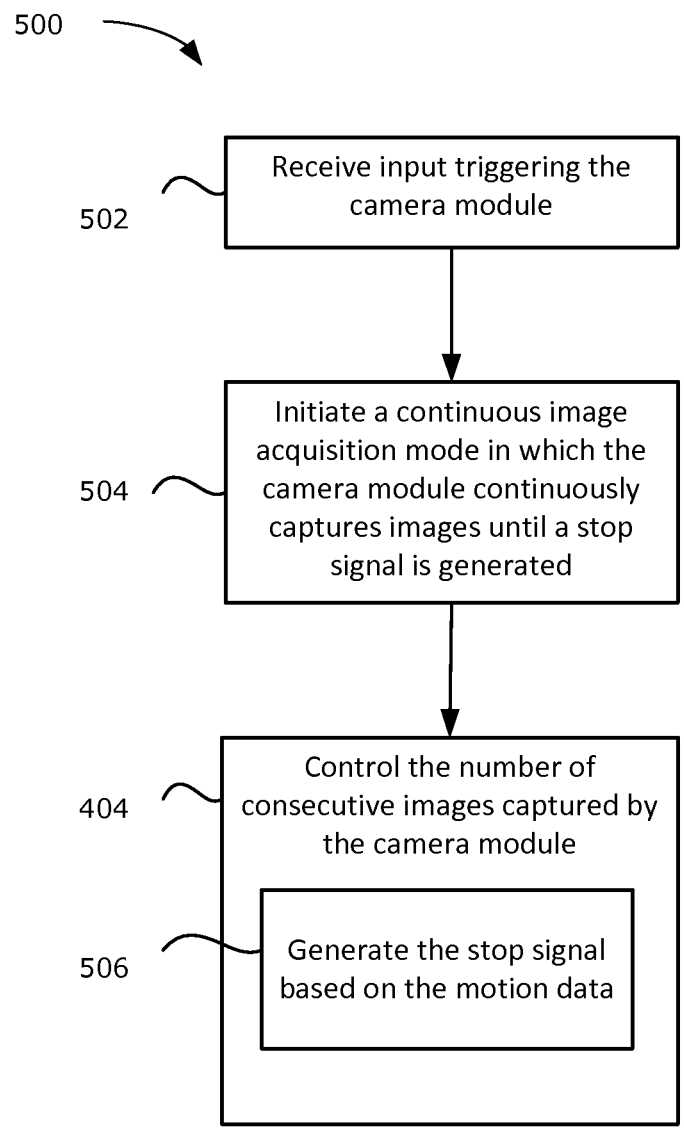
FIG. 5 is a flowchart illustrating another example method of controlling the number of consecutive images captured by the camera module in accordance with example embodiments of the present disclosure.

Referring now to FIG. 5, a flowchart of another example method 500 of controlling the number of consecutive images captured is illustrated. The electronic device 201 may be configured to perform the method 500 of FIG. 5. In at least some example embodiments, the processor 240 of the electronic device 201 is configured to perform the method 500 of FIG. 5. One or more applications 225 or modules on the electronic device 201 may contain computer readable instructions which cause the processor 240 of the electronic device 201 to perform the method 500 of FIG. 5. In at least some example embodiments, the camera application 280 stored in memory of the electronic device 201 is configured to perform the method 500 of FIG. 5. More particularly, the camera application 280 may contain computer readable instructions which, when executed, cause the processor 240 to perform the method 500 of FIG. 5.

It will be appreciated that the method 500 of FIG. 5 may, in at least some example embodiments, be provided by other software applications or modules apart from those specifically discussed above, for example the operating system 223. Accordingly, any features which are referred to as being performed by the electronic device 201 may be performed by any one or more of the software applications 225 or modules referred to above or other software modules. In at least some example embodiments, at least some of the method 500 of FIG. 5 may be performed by or may rely on other applications 225 or modules.

In at least some example embodiments, parts of the method 500 may be performed prior to 402 (for example, 502 and 504) and parts of the method 500 may be performed at 404 (for example, 506) of the method 400 of FIG. 4.

The method 500 includes, at 502, receiving an input triggering the camera module 253 (e.g. receiving a shutter release input). The input may trigger the camera module 253 to capture a number of consecutive images. That is, the electronic device 201 receives an input to release the shutter of the camera module to capture a number of consecutive images within a period of time. In at least some example embodiments, the input may be received when the camera module 253 is operating within the burst operating mode. The input may be received by an input interface 206 associated with the electronic device 201. For example, the input may be received by a navigational input device such as a trackball, a trackpad or a touchscreen display, or a physical keyboard associated with the electronic device 201 to trigger the camera module 253.

In response to receiving the input to trigger the camera module 253, the electronic device 201, at 504, initiates a continuous image acquisition mode in which the camera module 253 continuously captures images until a stop signal is generated. That is, the camera module 253 is configured to continuously capture images until it is commanded to stop.

At 404, the electronic device 201 may control the number of consecutive images captured by the camera module 253 based on the motion data (which is obtained from the motion sensor 282), when the camera module 253 is triggered. 404 is discussed in greater detail above with reference to FIG. 4.

In the embodiment of FIG. 5, at 404, in controlling the number of consecutive images captured, the electronic device 201 may, at 506, generate a stop signal based on the obtained motion data. That is, the stop signal may be generated depending on the movement of the electronic device 201 (and associated camera module 253) defined by the motion data, when the camera module 253 is triggered to capture consecutive images.

For example, the stop signal may be generated when the motion data indicates that at least a pre-determined number of images have been captured at times when the motion of the electronic device 201 was below a threshold. That is, the electronic device 201 may analyze the motion data to determine the number of images captured by the camera module 253 when the motion of the electronic device 201 is below the threshold. The motion data may provide information indicating the capture of each image by the camera module 253 for various levels of motions of the electronic device. Accordingly, the electronic device 201 may check the motion data to determine if at least the pre-determined number of images has been captured during levels of motion of the electronic device that is below the threshold. If so, the electronic device 201 generates the stop signal. Otherwise, the electronic device 201 may continue to check the motion data until the pre-determined number of images are captured. In at least some example embodiments, the stop signal may not be generated as the maximum number of images captured by the camera module 253 for each trigger may be reached (for example, the capacity of the image buffer 255 is reached) without the camera module 253 capturing the pre-determined number of images.

In at least some example embodiments, the stop signal is generated when at least one image has been captured at a point in time when the motion of the electronic device 201 was below a threshold. That is, the pre-determined number of images is set to one image, and the electronic device 201 may analyze the motion data to determine if the camera module 253 captures at least one image when the motion of the electronic device 201 is below the threshold.

As mentioned above, in at least some example embodiments, when the electronic device 201 is operating within the continuous image acquisition mode, the electronic device 201 may further associate the captured images with motion data representing the amount of motion occurring at the electronic device 201 when the captured images were obtained, determine whether the amount of motion exceeds a threshold, and discard the captured images that are associated with motion data exceeding the threshold. These operations are performed in a similar manner as 406, 408 and 410 respectively which are described in greater detail above with reference to FIG. 4.

While the present application is primarily described in terms of methods, a person of ordinary skill in the art will understand that the present application is also directed to various apparatus such as an electronic device 201 including a mobile communications device. The electronic device 201 includes components for performing at least some of the aspects and features of the described methods, which may be by way of hardware components (such as the flash memory 244 and/or the processor 240), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method implemented by a processor of an electronic device, the electronic device having a camera module, the camera module being configured to temporarily capture a number of consecutive images to an image buffer when operation of the camera module is triggered, the method comprising:
   obtaining motion data from a motion sensor on the electronic device, the motion data being generated based on movements of the electronic device; and
   based on the motion data, controlling the number of consecutive images captured by the camera module when operation of the camera module is triggered.

2. The method of claim 1, further comprising: determining whether motion of the electronic device as represented by the motion data is greater than a pre-determined threshold, and wherein controlling the number of consecutive images captured by the camera module comprises: when the motion is greater than the pre-determined threshold, increasing the number of consecutive images captured by the camera module.

3. The method of claim 1, further comprising: determining whether motion of the electronic device as represented by the motion data is less than the pre-determined threshold, and wherein controlling the number of consecutive images captured by the camera module comprises: when the motion is less than the pre-determined threshold, decreasing the number of consecutive images captured by the camera module.

4. The method of claim 1, further comprising:
   associating a captured image with motion data representing the amount of motion occurring at the electronic device when that captured image was obtained;
   determining, based on the motion data associated with the captured image, whether the amount of motion exceeds a threshold; and
   when the amount of motion exceeds the threshold, discarding the captured image.

5. The method of claim 4, wherein discarding the captured image comprises: removing the captured image from the image buffer and capturing an image to replace the discarded captured image.

6. The method of claim 4, further comprising: selecting the threshold based on prior motion data associated with previously captured images.

7. The method of claim 1, further comprising:
   storing one or more of the captured images in permanent memory associated with the electronic device.

8. The method of claim 1, further comprising:
   receiving input triggering operation of the camera module;
   in response to receiving the input triggering operation of the camera module, initiating a continuous image acquisition mode in which the camera module continuously captures images until a stop signal is generated,
   and wherein controlling the number of consecutive images captured by the camera module comprises: generating the stop signal based on the motion data.

9. The method of claim 8, wherein generating the stop signal based on the motion data comprises: automatically generating the stop signal when the motion data indicates that at least a predetermined number of images have been captured at times when the motion of the electronic device was below a threshold.

10. The method of claim 9, wherein the stop signal is generated when at least one image has been captured at a point in time when the motion of the electronic device was below a threshold.

11. The method of claim 8, further comprising, when the electronic device is operating in the continuous image acquisition mode:
   associating a captured image with motion data representing the amount of motion occurring at the electronic device when that captured image was obtained;
   determining, based on the motion data associated with the captured image, whether the amount of motion exceeds a threshold; and
   when the amount of motion exceeds the threshold, discarding the captured image.

12. The method of claim 1, further comprising:
   receiving input triggering operation of the camera module, and wherein controlling the number of consecutive images captured by the camera module when operation of the camera module is triggered comprises:
   in response to receiving the input triggering operation of the camera module:
     based on the motion data, selecting the number of consecutive images to be captured; and
     capturing images in accordance with the selected number.

13. An electronic device comprising:
   a memory;
   a camera module configured to temporarily capture a number of consecutive images to an image buffer when operation of the camera module is triggered;
   a motion sensor; and
   a processor coupled to the memory, the camera module and the motion sensor, the processor being configured to:
     obtain motion data from the motion sensor, the motion data being generated based on movements of the electronic device; and
     based on the motion data, control the number of consecutive images captured by the camera module when operation of the camera module is triggered.

14. The electronic device of claim 13, further configured to: determine whether motion of the electronic device as represented by the motion data is greater than a pre-determined threshold, and wherein controlling the number of consecutive images captured by the camera module comprises: when the motion is greater than the pre-determined threshold, increasing the number of consecutive images captured by the camera module.

15. The electronic device of claim 13, further configured to: determine whether motion of the electronic device as represented by the motion data is less than the pre-determined threshold, and wherein controlling the number of consecutive images captured by the camera module comprises: when the motion is less than the pre-determined threshold, decreasing the number of consecutive images captured by the camera module.

16. The electronic device of claim 13, further configured to:
    associate a captured image with motion data representing the amount of motion occurring at the electronic device when that captured image was obtained;
    determine, based on the motion data associated with the captured image, whether the amount of motion exceeds a threshold; and
    when the amount of motion exceeds the threshold, discard the captured image.

17. The electronic device of claim 16, wherein discarding the captured image comprises: removing the captured image from the image buffer and capturing an image to replace the discarded captured image.

18. The electronic device of claim 16, further configured to: select the threshold based on prior motion data associated with previously captured images.

19. The electronic device of claim 1, further configured to:
    store one or more of the captured images temporarily saved in the image buffer in the memory.

20. A non-transitory computer readable storage medium comprising computer executable instructions which, when executed, configure a processor to:
    obtain motion data from a motion sensor on an electronic device, the motion data being generated based on movements of the electronic device; and
    based on the motion data, control the number of consecutive images captured by a camera module of the electronic device when operation of the camera module is triggered.

* * * * *